Dec. 24, 1929.  D. LE R. MANTLE ET AL  1,740,932
MOVING PICTURE PROJECTOR
Filed Oct. 2, 1924   3 Sheets-Sheet 1
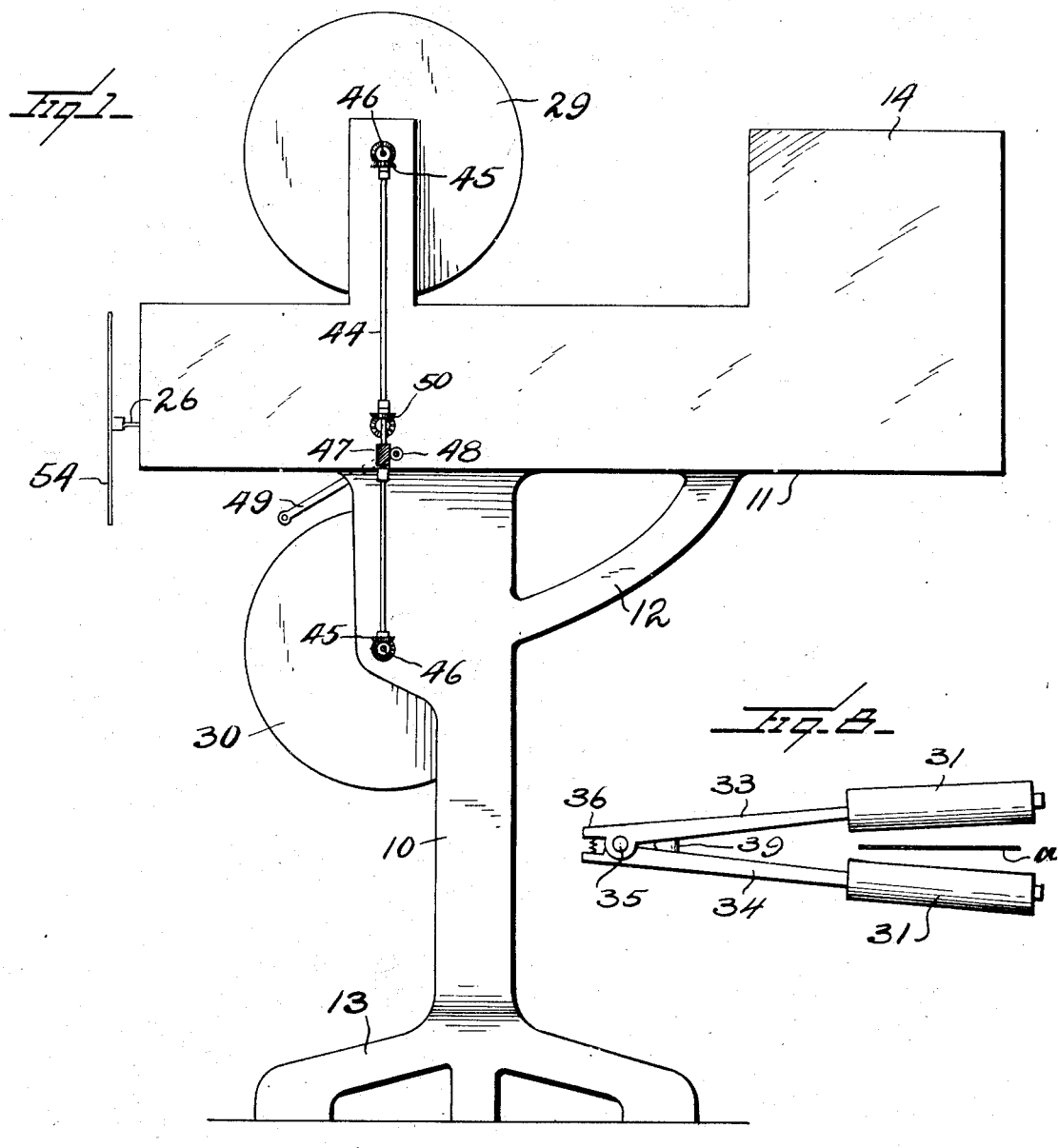
Inventors
D. L. Mantle
& G. L. Gordon
By Watson E. Coleman
Attorney

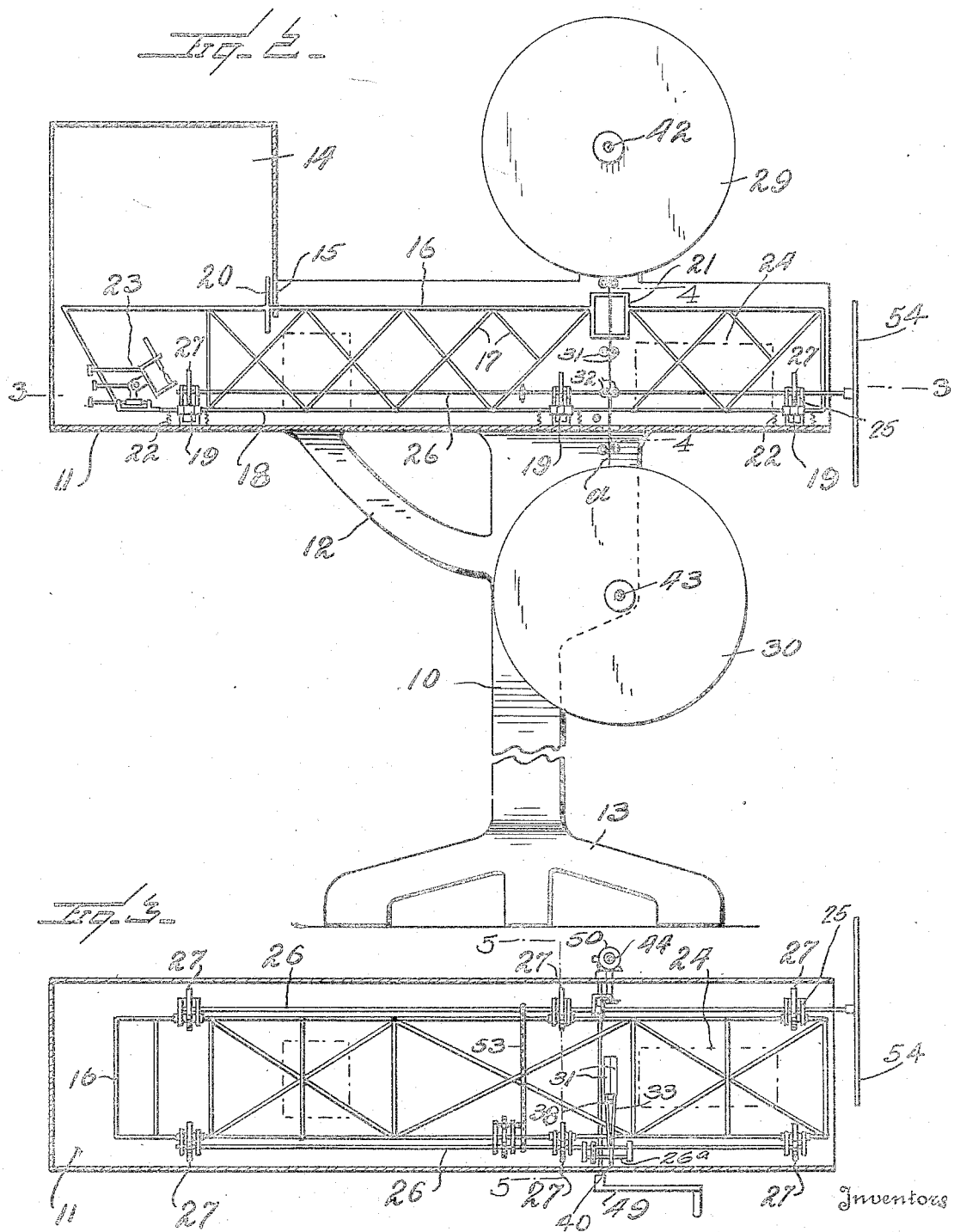

Dec. 24, 1929.   D. LE R. MANTLE ET AL   1,740,932
MOVING PICTURE PROJECTOR
Filed Oct. 2, 1924   3 Sheets-Sheet 3
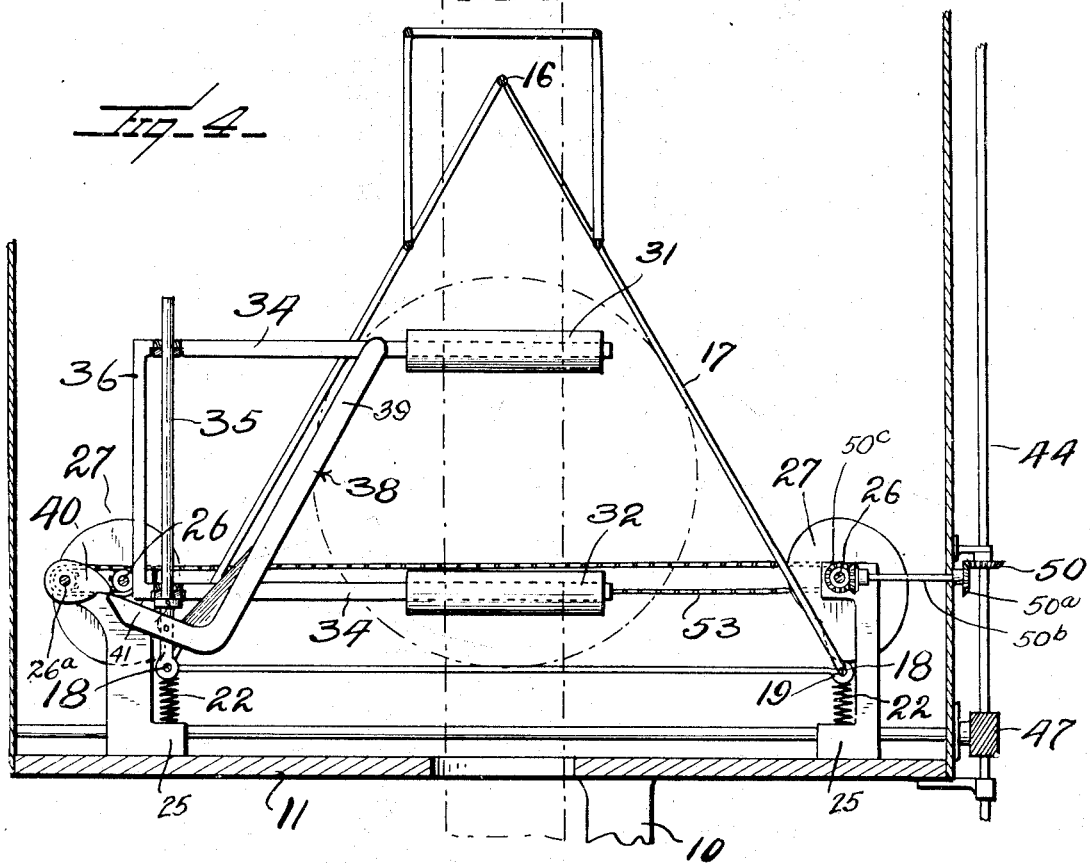
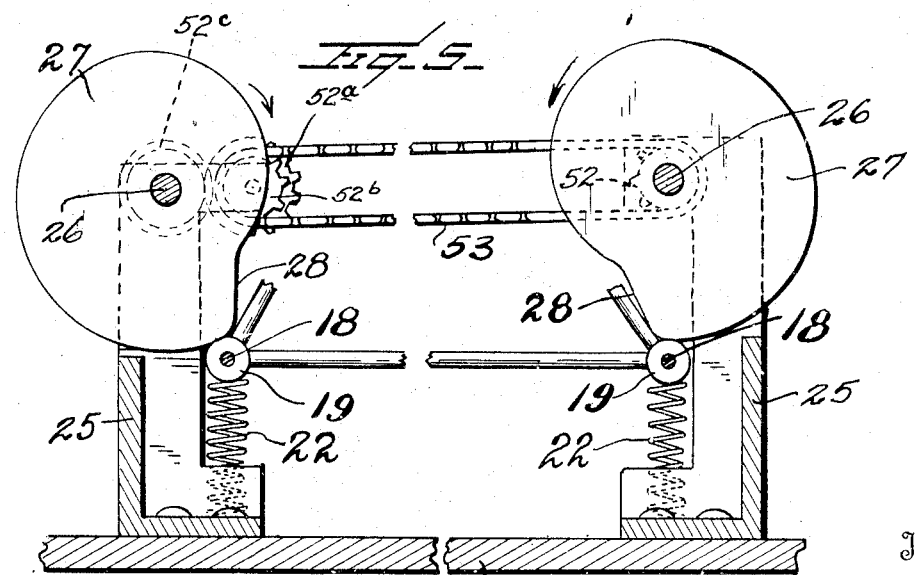
Inventors
D. L. Mantle
& G. L. Gordon
By Watson E. Coleman
Attorney Patented Dec. 24, 1929

1,740,932

UNITED STATES PATENT OFFICE

DAVID LE ROY MANTLE AND GRIFFITH L. GORDON, OF PAWHUSKA, OKLAHOMA

MOVING-PICTURE PROJECTOR

Application filed October 2, 1924. Serial No. 741,249.

This invention relates to moving picture machines, and particularly to that class of moving picture machines wherein the film moves continuously as distinguished from those moving picture machines in which the film moves intermittently, the picture being projected while the film is stationary.

The general object of the present invention is to provide a moving picture machine of the character stated in which the frame carrying the lenses and the light moves downward with the picture and then moves upward while the shutter obscures the picture.

A further object is to provide a construction of this character wherein the frame supporting the lens system and the light is mounted for movement within a supporting casing or platform and is shifted downward by means of cams and is shifted upward to its initial position ready to project a new picture by means of springs.

A still further object is to provide a construction of this character wherein provision is made for steadying the film as the movable frame supporting the lens system and light moves downward with the frame.

Another object is to provide rollers between which the film passes and by which it is steadied, said rollers being mounted upon the frame and opening with the upward movement of the frame but closing upon the film on the downward movement of the frame.

Still another object is to provide cams for shifting the frame downward so constructed that there will be no sudden jar when the film rises under the action of the springs and with the downward movement will be gradual and steady.

A further object is to provide means whereby the instrumentalities before referred to may be operated by means of a crank and the film fed continuously downward from the upper magazine into the lower magazine.

Other objects have to do with the details of construction and arrangement of parts as will appear more fully hereinafter.

Our invention is illustrated in the accompanying drawings, wherein:—

Figure 1 is a side elevation of a moving picture machine constructed in accordance with our invention;

Figure 2 is a like view to Figure 1 but viewed from the opposite side and showing the platform and the side walls thereof in section, the movable frame being shown in elevation;

Figure 3 is a section on the line 3—3 of Figure 2;

Figure 4 is an enlarged sectional view on the line 4—4 of Figure 2;

Figure 5 is an enlarged view of the cams 27, a portion of the frame and of the brackets for mounting the cams;

Figure 6 is a top plan view of one of the brackets for supporting the cam shafts 26 and the cams;

Figure 7 is a top plan view of the film engaging rollers closed;

Figure 8 is a like view to Figure 7 but showing the film engaging rollers open;

Figure 9 is a diagrammatic view showing the manner in which the beam of light from the vertically movable projecting apparatus is kept constantly upon the screen S.

Referring to these drawings, 10 designates a pedestal and 11 a platform mounted upon the pedestal in any suitable manner having a brace 12, the lower end of the pedestal being provided with a base 13. The platform is elongated and may be of any suitable configuration and at the rear end carries a light housing 14. This light housing is cubical in form but is open on its forward face from a point above the platform to the platform, this opening being designated 15. The platform may, as before stated, be of any suitable shape, and disposed within the platform and moving vertically with relation thereto is a frame composed of the three longitudinally extending rods or bars 16 and 18 arranged in triangular relation, these rods being connected by lattice work 17 which extends downward from the topmost rod or apex of the triangle to the two lower rods 18. The frame, therefore, viewed from its forward or rear ends is triangular in cross section, as this gives the greatest possible strength to the frame with at the same time a maximum lightness.

Each rod 18 of the frame carries upon it a plurality of rollers 19, these rollers being loose on the rods. The frame also is provided with a guide 20 that fits against the inner face of the light housing. The frame also carries a rectangular film guide 21 which is mounted upon the uppermost rod of the frame and through which the film passes from the upper to the lower magazine. Springs 22 are operatively supported at their lower ends upon the platform and at their upper ends engage with the rods 18 of the frame and force the frame upward. Disposed within the frame is an illuminating means such as the ordinary arc lamp, designated generally 23, and at the forward end of the frame there is disposed the usual projecting lens system, designated 24. The film, of course, passes downward through the space between the light and the projecting lens.

Mounted upon brackets or other suitable bearings, designated 25, in turn mounted upon the platform 11 are the lateral shafts 26. These are disposed above the rods 18 and carry upon the shafts the cams 27, these having preferably the form illustrated in Figure 5 so as to provide a slight curve 28 in the cam face which, as will hereafter appear, keeps the lighting system and the lenses from being broken by a too sudden upward movement. As the shafts 26 revolve, these cams act to bear against the rollers 19 and thus depress the triangular frame supporting the light and the lens system. This downward movement of the frame is at the same speed as the downward movement of the film $a$ from the upper magazine 29 to the lower magazine 30. The shafts 26 which carry the cams 27 are driven by means which will be hereinafter stated.

Disposed on each side of the travel of the film and carried by and movable with the frame are upper and lower pairs of film rollers 31 and 32 respectively. The rollers of each pair are disposed on opposite sides of the film $a$ and are so mounted that when the frame moves upward under the action of the springs 22, the film rollers open, and when the frame moves downward with the film and at the same speed thereas, the film rollers close against the film.

As shown in Figure 8, the upper pair of rollers 31 are mounted upon arms 33 and 34, these arms being pivoted upon a vertical shaft or pintle 35 and having extensions 36 at their rear ends, between which extensions is located a spring 37 which urges the arms 33 and 34 toward each other and causes the closing of the rollers upon the film. The lower rollers 32 are also mounted upon arms 33 and 34 in the same manner as the upper rollers, these arms being in turn pivoted upon the pintle 35 and having the extensions between which the spring 37 is located.

For the purpose of opening the rollers on the upward movement of the frame, we pivot on the pintle 35 a bell crank trip lever 38 having a blade 39 which extends between the arms 33 and 34 and acts as a wedge. When arm 39 is pulled rearward it separates the rollers 31 and 32 against the action of the springs 37. When arm 39 moves forward it permits the springs 37 to shift the rollers toward each other. To operate this trip lever 38, we provide a cam 40 mounted upon a cam shaft $26^a$ driven from shaft 26 by a sprocket chain. This cam acts on one arm 41 of bell crank lever 38. Preferably the brackets 25 which support the shafts 26 are substantially U-shaped in cross section at their lower ends. The springs 22 are located on each side of the brackets (see Figure 6) and rollers $19^a$ are mounted on the rods 18 to bear against and be guided by the inner edge face of each bracket.

Extending through the film magazines are the winding shafts 42 and 43 respectively. The cam shaft 26 and the film winding shafts are operated as follows: Disposed in suitable bearings upon the exterior of one side wall of the platform is a vertical shaft 44, this shaft carrying the beveled gears 45 at its upper and lower ends respectively which engage with coacting bevel gears 46 mounted upon the shafts 42 and 43 respectively. This vertical shaft 44 is illustrated as carrying upon it the worm gear 47, which in turn is operated by a worm 48 operated by means of a crank 49. The shaft 44 also carries upon it a beveled gear wheel 50 which meshes with a beveled gear wheel $50^a$ on a transverse shaft $50^b$ which carries upon it a beveled gear wheel which engages a beveled gear wheel $50^c$ on one of the cam shafts 26, and power may be communicated from one of the cam shafts to the other cam shaft 26 either by means of gearing or, as illustrated, by means of sprocket wheels 52 and sprocket chain 53. Inasmuch as the two cams 27 must rotate in opposite directions as shown most clearly in Figure 5, the sprocket chain 53 is not engaged directly with the shaft 26 but engaged with a sprocket wheel $52^a$ which drives a gear wheel $52^b$ in turn engaging a gear wheel $52^c$ on the adjacent shaft 26 as shown in Figure 5. We do not wish to be limited to this, however, as any means for transmitting motion from one cam shaft to the other may be used or each of these cam shafts may be operatively connected to the driving shaft 44. The cam shaft 26, as before explained, carries upon it the cams 27 and also operates the cams 40 so that motion is communicated from the crank 49 to the cam shafts 26 and to the cam 40 so as to cause the proper vertical reciprocation of the light and lens carrying frame and the opening and closing of the film guiding rollers.

It is to be understood that the film magazines are of such construction that the films are unwound from the center of the film and wound up upon the center of the roll of film so that the feeding and reeling are accomplished at the same speed. The exact mechanism whereby this is secured is not illustrated in the present application inasmuch as it has no part in the present invention.

The shutter 54 may be operated in any suitable manner, the closed portion of the shutter cutting across the beam of projected light at the time when the frame moves upward under the action of the springs 22 and the open portion of the shutter is coincident with the beam of light when the frame with the lens system moves downward. We have illustrated the shutter 54 as being mounted upon shaft 26, and thus it will be seen that as this shaft is operated the shutter will be rotated to occult the beam of light proceeding from the projecting machine during the period when the frame is moving upward and permit the projection of the beam of light when the frame is moving downward. It will be obvious that this manner of supporting and operating the shutter may be varied in many ways without departing from the spirit of the invention and that any means may be used which will cause the proper obscuring of the projected beam during the upward movement of the frame with its light and lens and permit the proper projection of the beam upon the downward movement of the frame.

In Figure 9 we have illustrated diagrammatically the relation of a moving picture machine of the character described to the screen S. The movable frame reciprocates vertically so as to carry the axis of the light from the line X to the line Y and back again on the line X. While if the machine were placed relatively close to the screen, it would be necessary to cause the movable frame to move on an arc, the center of which would be coincident with the screen at the intersection of the light axis, yet where the machine is mounted at the normal and usual distance away from the screen, the necessity for an arcuate movement of the frame is negligible. With this machine, the film moves from the upper magazine to the lower magazine and as the film moves downward, the projecting apparatus moves downward with the film. As soon as a complete picture has moved downward the length of the film under the cams 27, the cams release the movable frame and the springs 22 then act to lift the movable frame a distance equal to the next picture and the space between the picture, the rollers opening at this time so as not to tear the film, and the rollers again grip the film and the movable portion of the frame moves downward with the film, the axis of the beam of light being coincident with the center of the picture.

Mechanism of this character may be very simply and cheaply made and does away entirely with the necessity of film sprockets and the more or less complicated mechanism which is necessary in order to secure an intermittent downward movement of the film. Furthermore, it eliminates the wear and tear to which the moving picture film is at present subjected and these films will last very much longer than they do now and with far less danger of tearing, marring or otherwise injuring the films. The movement of the film from the upper magazine to the lower magazine is steady and continuous and the picture projected will be also steadier than with the ordinary projecting apparatus. The elimination of the complicated film shifting mechanism at present used very greatly simplifies the machine and reduces the cost and renders it much more easy to operate. The movable frame is triangular in cross section for the reason that this form affords maximum strength and rigidity with a minimum of parts. This movable frame is trussed by means of the diagonal truss bars 17 so that it is rendered particularly strong. The cams 27 are so formed as to permit a quick but gentle upward movement of the movable frame without jar or jerk and without vibration. In other words, there is a relatively slow downward movement of the frame under the action of the cams and a relatively quick upward movement of the frame under the action of the springs and the re-entrant portions of the cam.

We do not wish to be limited to details of construction illustrated, as these may be modified in many ways without departing from the spirit of the invention. It is obvious, of course, that various means may be used to drive the mechanism and that the lighting and lens systems shown in the drawings are merely illustrative, as the particular lighting and lens systems have no part in our invention.

We claim:

1. A projector for moving pictures including a supporting platform, film magazines carried thereby, means for moving the film constantly from one magazine to the other, a frame disposed above the platform and carrying a lens system and a light system, between which systems the film operates, springs urging the frame upward, cams operating to cause the alternate bodily downward movement of the frame at a speed equal to that of the film and the rapid upward bodily movement thereof, a shutter, and manually operable means for feeding the film from one magazine to the other, operating said cams, and operating said shutter to cause the occultation of the projected beam while the frame is moving upward.

2. A projector for moving pictures including a fixed platform, a frame associated therewith and having a lens system and a light system, the film traveling between the systems and through the frame, springs carried by the platform and resiliently supporting the frame, cams operating on the frame above the springs, said cams being so formed as to cause the alternate bodily downward movement of the frame with the film and the alternate bodily upward movement of the frame under the action of the springs, a shutter operated in front of the lens system, and manually operable means for feeding the film from one magazine to the other, operating said cams, and operating said shutter.

3. A projector for moving pictures including a fixed support, a frame coacting with the fixed support, said frame consisting of longitudinally extending rods and braces, a lighting system and a lens system supported in said frame, the platform having a housing partially enclosing the rear end of the platform and the lighting system, an upper and a lower magazine so disposed that the film will travel between the lens system and the lighting system, resilient means mounted upon the support and urging said frame upward, cam shafts operatively mounted upon the support and extending longitudinally through the frame and having cams, rollers mounted upon the frame and with which said cams coact, the cams being formed to alternately depress the frame and permit its upward movement under the action of the resilient means and cause the frame to travel downward at the same speed as the film and to permit the quick upward rise of the frame, and means carried by the frame for holding the film steady during the downward movement of the frame.

4. A projector for moving pictures including a fixed support, film magazine carried thereby, a frame coacting with the support, a lens system and a light system carried by the frame and between which the film is adapted to move, longitudinally extending rollers carried upon the frame, longitudinally extending cam shafts mounted upon the support and having cams engaging the rollers, the cams being so formed as to cause the downward movement of the frame at the same rate of speed as the downward travel of the film and the quick upward movement of the frame under the action of the springs, manually operable means for feeding the film from one magazine to the other and operating said crank shaft, means for occulting the beam projected from the machine during the period when the frame is moving upward, and means movable with the frame for steadying the film and holding it above and below the axis of the beam while the frame is moving downward.

5. A projector for moving pictures including a fixed support, film magazines carried thereby, a frame coacting wtih the support, a lens system and a light system carried by the frame and between which the film is adapted to move longitudinally extending rollers carried upon the frame, longitudinally extending cam shafts mounted upon the support and having cams engaging the rollers, the cams being so formed as to cause the downward movement of the frame at the same rate of speed as the downward travel of the film and the quick upward movement of the frame under the action of the springs, manually operable means for feeding the film from one magazine to the other and operating said crank shaft, means for occulting the beam projected from the machine during the period when the frame is moving upward, means movable with the frame for steadying the film and holding it above and below the axis of the beam while the frame is moving downward comprising upper and lower pairs of rollers disposed on opposite faces of the film, and means for causing the closing of the rollers against the film while the frame is moving downward and the opening of the rollers while the frame is moving upward.

6. In a projector for moving pictures including a lens system and a light system and a film moving between the lens system and light system, means for moving the lens system downward with the film and at the same rate thereas and for giving the lens system a quick upward movement, means for occulting a beam projected from the light system and through the film during the period when the lens system is moving upward, means movable with the lens system for steadying the film and supporting it above and below the axis of the beam while the lens system is moving downward comprising upper and lower pairs of rollers disposed above and below the axis of the lens system, arms carrying said rollers, springs urging the arms of each pair of rollers toward each other to thus cause the rollers to bear against opposite faces of the film, and a cam acting upon the film to spread the rollers apart upon an upward movement of the lens system to permit the rollers to close upon the film upon a downward movement of the lens system.

7. In a projector for moving pictures including a lens system and a light system and a film moving between the lens system and light system, means for moving the lens system downward with the film and at the same rate thereas and for giving the lens system a quick upward movement, means for occulting a beam projected from the light system and through the film during the period when the lens system is moving upward, means movable with the lens system for steadying the film and supporting it above and below the axis of the beam while the lens system is moving downward comprising upper and lower pairs of rollers disposed on opposite faces of the film, each roller having an arm, a pintle upon which the arms of the upper and lower pairs of rollers are mounted, springs urging said arms of each pair of rollers toward each other, means for spreading the rollers apart comprising a bell crank lever having its upper blade disposed between the upper and lower pairs of rollers, a cam operating upon the other blade of the bell crank lever to cause the bell crank lever to operate to thereby spread the arms upon an upward movement of the lens system and permit the closing of the rollers upon the film on a downward movement of the lens system, and manually operable means for feeding the film operating the means for vertically reciprocating the lens system and operating said cam.

8. A projector for moving picture machines including a fixed support, upper and lower film magazines carried thereby, a vertical shaft operatively connected at their upper ends to the film magazines, a crank operatively engaging said shaft, a frame coacting with the support and carrying a lighting system and a lens system, the film from the magazines passing between the lighting system and the lens system, springs mounted on the support and urging the frame upward, rollers mounted upon the frame, cam shafts mounted above the rollers and carried by said support, cams thereon engaging said rollers and acting to alternately depress the frame at the same speed as that of the films and permit the upward movement of the frame a distance equal to one of the pictures on the film, upper and lower pairs of film engaging rollers mounted upon the frame disposed above and below the axis of the lens system, a shutter disposed in advance of the lens system, means operatively connecting the cam shafts with the first named shaft, and means for causing the shutter to move to an occulting position during the upward movement of the frame and to an open position upon a downward movement of the frame.

9. A moving projector machine of the character described including a platform having a lamp housing at its rear end and open on its front, a frame disposed longitudinally of the platform and extending into the lamp housing and including two lower longitudinally extending rods and upper medially disposed rods, a brace connecting the upper with the lower rods, a lighting system disposed upon the rear end of the frame within the lamp housing, a lens system disposed upon the forward end of the frame, means for feeding a film downward through the frame and between the lighting system and the lens system, means urging the frame upward, manually operable means for giving the frame a bodily vertical reciprocation toward and from the platform in time with the downward movement of the film, and a shutter carried by the frame and bodily movable therewith.

In testimony whereof we hereunto affix our signatures.
DAVID LE ROY MANTLE.
GRIFFITH L. GORDON.